United States Patent [19]

Lundberg

[11] 4,095,479

[45] Jun. 20, 1978

[54] EXPANSIBLE PULLEY WITH TORQUE AND CENTRIFUGAL RESPONSE

[75] Inventor: John P. Lundberg, Pequot Lakes, Minn.

[73] Assignee: Scorpion, Inc., Crosby, Minn.

[21] Appl. No.: 706,763

[22] Filed: Jul. 19, 1976

[51] Int. Cl.² .................... F16H 55/52; F16H 55/56
[52] U.S. Cl. .................. 74/230.17 E; 74/230.17 M; 74/230.17 A
[58] Field of Search ............. 74/230.17 E, 230.17 M, 74/230.17 A

[56] References Cited

U.S. PATENT DOCUMENTS

| | | | |
|---|---|---|---|
| 2,711,103 | 6/1955 | Miner | 74/230.17 M |
| 3,269,202 | 8/1966 | Getz et al. | 74/230.17 M |
| 3,395,587 | 8/1968 | Casini | 74/230.17 M |
| 3,599,504 | 8/1971 | Taylor | 74/230.17 E |
| 3,868,862 | 3/1975 | Bessette | 74/230.17 M |
| 3,908,475 | 9/1975 | Takagi et al. | 74/230.17 M |
| 3,968,702 | 7/1976 | Beaudoin et al. | 74/230.17 M |
| 3,996,811 | 12/1976 | Reese | 74/230.17 M |

*Primary Examiner*—Samuel Scott
*Assistant Examiner*—W. R. Henderson
*Attorney, Agent, or Firm*—Kinney, Lange, Westman and Fairbairn

[57] ABSTRACT

A V belt pulley clutch assembly for a variable speed transmission which may be either the driving or the driven pulley, and which has one movable sheave which is both speed and torque responsive, and wherein the torque responsive portions comprise raised spiral ramps on the hub of the movable portion of the V belt pulley driven through saddle type members riding on the spiral ribs. The ribs are spiraled axially along the hub of the movable portion of the V belt pulley in a direction so that when the driven member is subjected to more load the unit tends to shift into a lower drive ratio. That is when the drive clutch assembly is powered from a drive shaft, the spirals are arranged so that the pulley halves tend to separate under increasing load on the belt. The ribs are on the external surface of a hub and can be die cast draft free for permitting driving and sliding between two relatively movable pulley halves.

9 Claims, 6 Drawing Figures

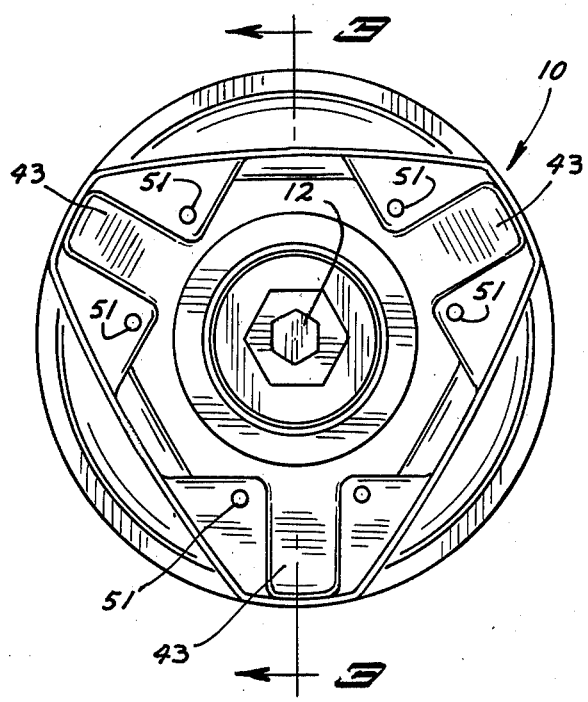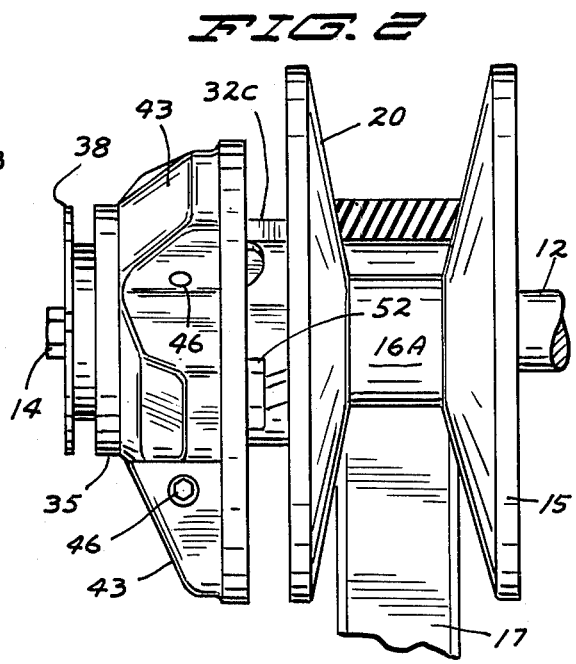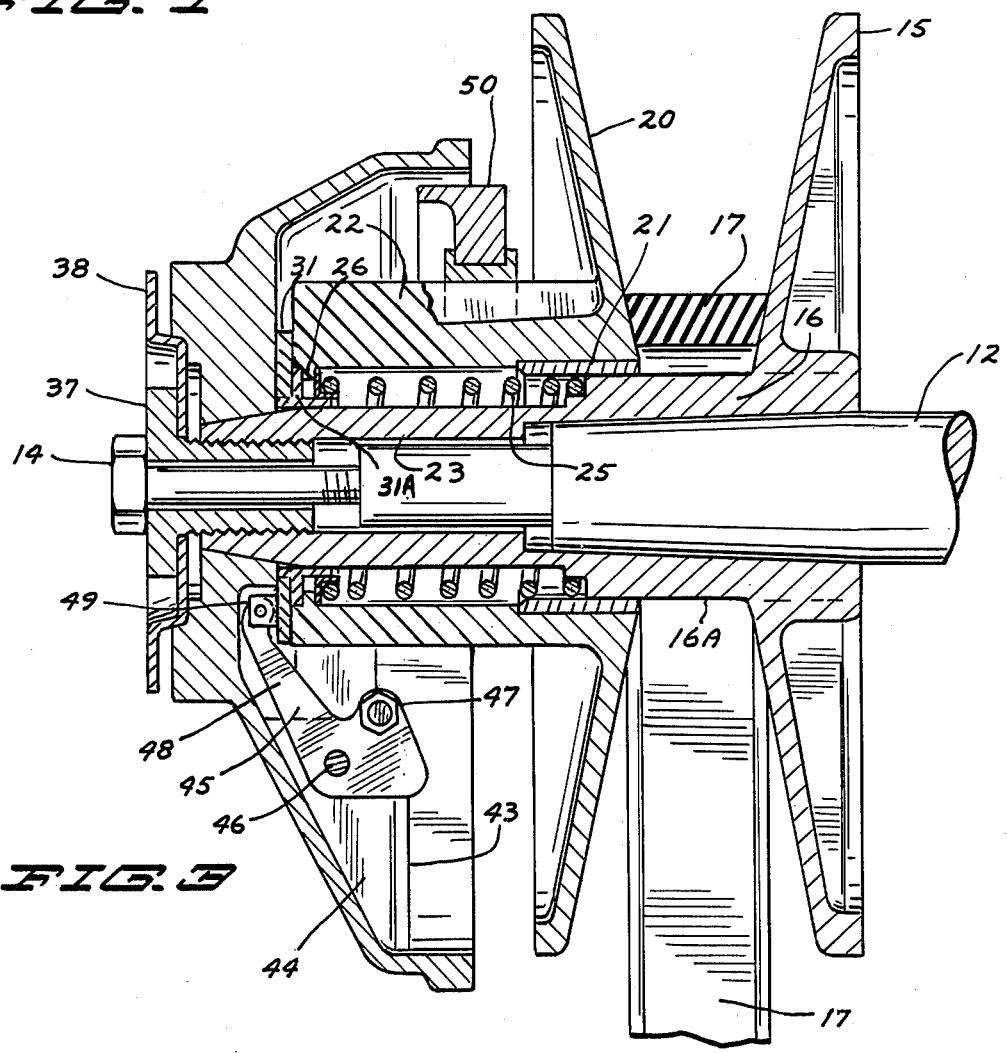

EXPANSIBLE PULLEY WITH TORQUE AND CENTRIFUGAL RESPONSE

BACKGROUND OF THE INVENTION

1. Field of the Invention

The present invention relates to torque sensitive clutch assemblies for use with V belts, which also may include speed sensitive means.

2. Prior Art

In the prior art various V belt clutches that are both speed and torque sensitive have been advanced. For example, U.S. Pat. No. 3,868,862 shows an expansible pulley having both speed and torque sensitive means thereon, and includes linkages that can be changed in position so that the torque sensitive means may either be added to or subtracted from the force of the centrifugal weights. That is, in this particular device the drive to the movable pulley half is through adjustable links and in one position, the links will tend to move the movable pulley half into a lower drive ratio under increasing load, and in another position will tend to move the pulley into a higher drive ratio with increasing load. However, in this patent, it appears that the links used for accomplishing this end may not have sufficient durability for extended use at high power transmission levels, nor under conditions where the pulley is changing frequently and rapidly. Costs of manufacture and assembly also appear to be high.

U.S. Pat. No. 3,395,587 shows a torque sensitive stepless speed change drive using a somewhat different principle, but providing a torque sensitive reaction, once a preset spring force is exceeded, that will cause the drive ratio to decrease as the torque or load on the clutch increases. A much different mechanism is utilized in this device.

In addition, applicant is aware of U.S. Pat. No. 3,996,811 which shows a combined speed and torque sensitive clutch, wherein the speed sensitive portions of the clutch are the same as that shown herein, but where the torque sensitive means includes facing, end engaging cam surfaces between the movable sheave and stationary portions of the clutch.

The inventor is further aware of a clutch similar to that shown in U.S. Pat. No. 3,968,702 where the cam lowers the drive ratio under load as with the present device but wherein wide spiral grooves were formed in a ring on the stationary member which partially surrounded the hub of the movable sheave portion, and short ribs adjacent the end of the movable sheave rode in the grooves. One problem with the described modified clutch was that the grooves had to be formed in the ring of the stationary member at a "negative rake angle" when viewed from the open end of the ring. This made it extremely difficult to fabricate, and required machining for forming the grooves.

Another patent of interest is French Pat. No. 1,148,087 which shows a speed and torque sensitive device.

SUMMARY OF THE INVENTION

The present invention relates to a clutch which can be made torque sensitive, and can be used either on the drive or driven side of a V belt power transmission assembly and which includes torque sensitive means that change the drive to a lower drive ratio upon an increase in load on the belt. The unit also may be made to be speed sensitive, when used on the output shaft of an engine for driving a vehicle such as a snowmobile, for example. The torque sensitive portions are constructed so that they can easily be manufactured and assembled in high production quantities, using die cast parts. Suitable bearing inserts that can be replaced when wear occurs also are provided.

In particular, spiral ribs formed on the movable portion of the sheave are made accessible for die casting when formed on a hub that extends laterally from the sheave itself. The spiral portions are formed integrally with the hub with zero draft.

In the form shown, the spiral ribs formed on the hub are driven through saddle members that are in turn mounted onto replaceable separately formed die cast supports, with the die cast supports mounted onto a clutch cover that is drivably attached to the output shaft of the engine. By separately forming the replaceable die cast members, a simple assembly can be made. There is no need for machining the spiral rib drive members, because they may be formed with zero draft in axial direction. The external ribs on the hub are accessible for die casting with no draft by use of sectional tools. Straight ribs can also be formed in this manner.

The device therefor becomes economical, and operates so that with increasing load it will decrease the drive ratio. This is particularly useful where it is desired to keep the engine operating in its maximum speed, under the influence of centrifugal weights or speed responsive means. The torque sensitive means insures that the engine speed will not drop significantly as load increases suddenly. The engine will not drop in rpm significantly and thus the vehicle, such as a snowmobile, can be kept operating at its optimum horsepower.

The end result is that the clutch is very responsive, and by balancing the weights and the speed responsive means properly a very sensitive clutch that permits maximum performance is obtained.

BRIEF DESCRIPTION OF THE DRAWINGS

FIG. 1 is an end view of the clutch assembly made according to the present invention;

FIG. 2 is a side view thereof showing a V belt in position on the variable speed clutch;

FIG. 3 is a sectional view taken as on line 3 — 3 in FIG. 1;

DESCRIPTION OF THE PREFERRED EMBODIMENT

Figure 4:
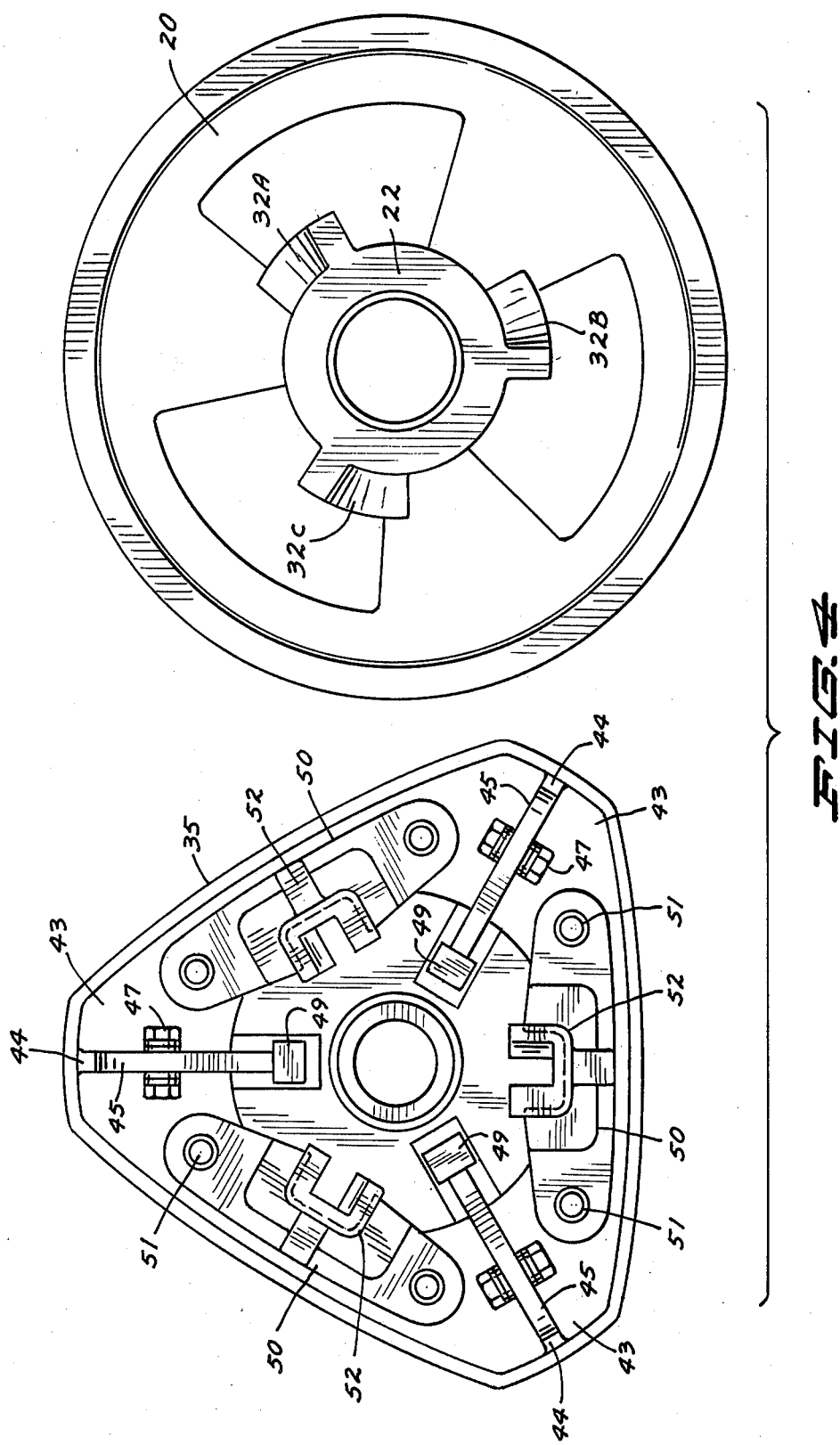
FIG. 4 is an exploded view of the clutch assembly with a clutch cover shown folded open and illustrating inner working details of the drive components of the present invention.

The clutch assembly illustrated generally at 10 is a variable speed clutch used with a V belt drive, wherein in a V-belt pulley one sheave portion is movable axially and annularly with respect to the other sheave portion, and wherein the assembly is mounted directly onto a shaft, such as an engine output shaft 12. It is also to be remembered that the torque sensitive portions of this clutch may be used wherein the sheaves are mounted onto a driven shaft, and in this instance the speed responsive means would likely be eliminated.

The type of clutch used herein is primarily used at the present time in snowmobiles and other similar vehicles, but can be used with any desired drive unit. The clutch as shown is generally used with another variable speed V belt pulley. The clutch as shown is of the type that is speed sensitive, or in other words centrifugal force sensitive so that it will permit the sheave to open and let the belt being driven drop down into the center portions of the hub in an engine idle position when the engine shaft speed drops.

As the engine speed picks up, the sheave side plates move together, due to the centrifugal response feature and drive the belt with a small effective diameter sheave, and then as the speed increases the movable sheave side plate will move toward the stationary side plate to a maximum, depending on the speed of the engine. This type of clutch is quite well known in general principle, but the present device adds improvements as will be explained.

The clutch assembly includes a main mounting hub illustrated generally at 11 that mounts onto the drive shaft 12 of an engine, as shown, in this instance the shaft 12 is the powered shaft, and the clutch assembly is the power input clutch. The hub 11 is drivably mounted relative to the drive shaft 12, as can be seen, it can be mounted with a suitable tapered surface 13. The shaft 12 has a taper that mates with the inner tapered surface 13 of the hub, and is held in place with a suitable cap screw 14 that will act against the hub as will be explained and force the hub onto the tapered surface.

The hub 11 includes the stationary sheave side plate or portion 15. The stationary sheave plate or portion comprises one-half of a V belt sheave, and becaus it is fixed to the hub 11 it is called the stationary sheave portion in this instance. It does not move in axial direction of the shaft 12. The hub 11 includes the center portion 16 which is of sufficient axial length in direction of the axis of rotation of the clutch to provide a support surface 16A for the V belt 17 that is to be driven (when the clutch is disengaged), and also provides a support surface for slidably supporting a movable sheave side plate assembly 20 that comprises the outer half of the drive sheave. The side plate 20 engages the side surface of the belt 17 opposite from the stationary plate 15. The movable side plate includes an internal bushing 21 that rides on the surface 16A of the center portion 16 of the hub, and also includes a laterally extending hub portion 22 which is concentric with the hub 11, and which fits over the hub 11.

At the outer end of the hub 11, that is the end opposite from the fixed sheave portion 15, the hub is turned down to form a smaller diameter portion indicated at 23. The hub 22 surrounds this smaller diameter end portion 23, and the portion 23 joins the hub center portion 16 at a shoulder 24. A coil spring 25 is mounted over the turned down portion 23, and rests against the shoulder 24, and is held inside the interior opening of the hub 22 with a small annular internal shoulder 26 that is formed integrally with the lateral hub portion 22. A formed retainer washer 27 is positioned inside the spring, and serves as a support for the spring end to keep it from seizing on the portion 23 when it is in use. The movable sheave portion 20 and its hub 22 can therefore move in axial direction relative to the hub 11, so that the sheave portion 20 moves axially toward and away from the stationary sheave portion 15. The spring 25 urges the two sheave portions apart.

A thrust washer 31 is positioned against a shouldered washer 31A which bears on the end of the hub 22, and washer 31A an inwardly extending ring that supports the washer 27 spaced from the outer surface of hub 23 so that the end of the spring 25 is held in spaced relationship to the outer surface of the hub portion 23.

Figure 5:
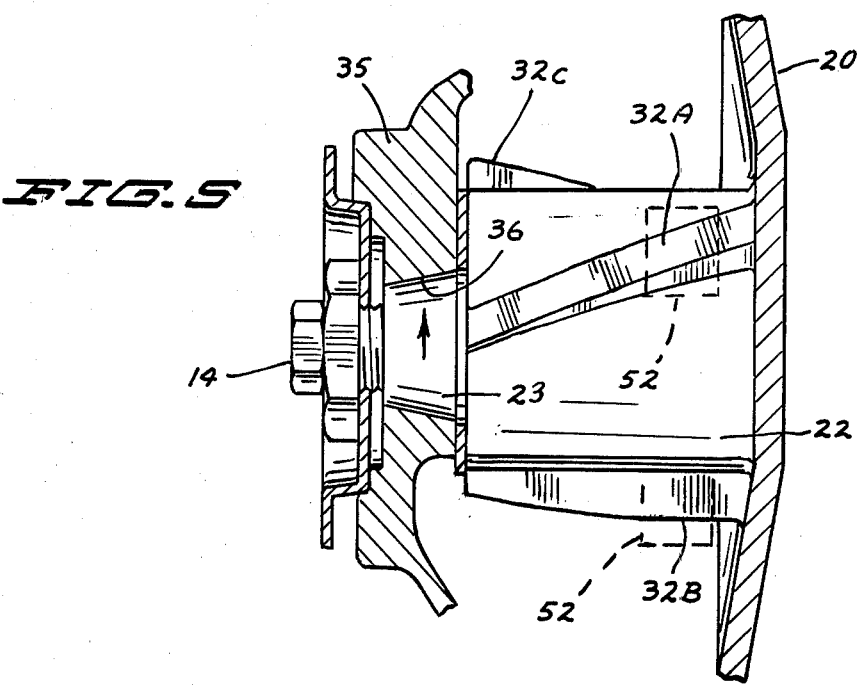
FIG. 5 is a plan view of ramp members used on one side of the clutch hub, with parts in section and parts broken away.

On the outer surface of the hub 22, there are a plurality of spiral ribs 32A, 32B and 32C. These ribs are relatively narrow in transverse dimension, and extend in a direction axially along the hub 22, as can perhaps best be seen in FIG. 5. The amount of spiral, or the lead of the ribs, is selected, as will be more fully explained, so that the movable sheave portion 20, which is attached to hub 22, is torque responsive when used in connection with this driving member. The ribs are formed so that they can be die cast as a unit with hub 22 and movable sheave portion 20, and are thus integrally formed. The ribs extend all the way to the end surface of the hub 22, as shown, and are joined to the outer surface of the movable sheave portion 20. In this way the ribs help reinforce the sheave portion, as well as serve to provide the torque responsive function for the clutch as will be explained. The side surfaces of the ribs 32 that is, the surfaces extending outwardly (generally in radial direction) from the surface of hub 22 are used for the drive surfaces for driving the hub 22 and movable sheave portion 20.

A clutch cover assembly illustrated generally at 35 has a tapered interior bore at the closed end thereof indicated at 36, which mounts over a mating tapered surface at the end of the hub 23. A cap screw 37 having a through bore is used, and screw 37 is threaded onto the interior of the bore in the hub 23 to hold the clutch cover 35 in position. A suitable rope start washer 38 may be used with the unit, and held in place on the clutch cover. The cap screw 14 extends through the bore in the cap screw 37, as shown, and when the cap screw 37 is tightened down the tapered surface 36 locks on the mating tapered surface of the hub 23 to hold the clutch cover assembly securely onto the stationary sheave portion, so that it will therefore rotate with the drive shaft 12.

The clutch cover is formed with three bosses 43 which extend radially outward from the center portion of the hub as shown, and each of these bosses have an interior slot which is indicated at 44 (see FIG. 4). These slots 44 are each of size to receive a control arm 45 that is pivotally mounted with a suitable pin 46 to the clutch cover. The pivot axes of the arms 45 are at right angles to the rotational axis of the clutch assembly. Suitable weight members 47 can be attached to the arms adjacent the outer ends thereof. The weights thus are adjacent the movable sheave portion 20, and the arms 45, which are the centrifugal force actuators, are speed responsive means which have an actuator end 48 which extends downwardly to the position adjacent the outer end of the hub 22. The actuator ends 48 have shoes 49 pivotally mounted to the actuator ends. The shoes 49 have flat surfaces that engage and ride against the radial surface of the thrust washer 31 so that there can be relative rotation between the shoes 49 and actuator arms 47 and the hub 22 when the shoes 49 are bearing against the washer 31. This means that the hub 22, and its attached sheave portion 20 can rotate with respect to the stationary sheave 15, insofar as the speed sensitive means is concerned.

As can perhaps also best be seen in FIG. 4, the clutch cover carries three drive plates or lugs indicated generally at 50, which are attached at opposite ends thereof to portions of different and adjacent bosses 43 with suitable rivets 51. These rivets 51 can be seen in FIG. 1 as well, and the drive plates or lugs form bridge members between the adjacent bosses, and are supported for rotation with the clutch cover.

In the central portions of each of these bridge members or plates 50, a small receptacle or recess is formed to receive a drive wear pad 52 which is made of a suitable bearing material selected for good wear resistance. The pads 52 form saddle members, each of which fits over one of the ribs 32, and forms a driving connection between the clutch cover and its associated rib and thus between the clutch cover and the hub 22 and movable sheave portion 20. The saddle members or wear pads 52 can slide axially along the ribs, but fit close enough so that they will tend to drive against the side surface of the ribs if the clutch movable sheave portion 20 and the hub 22 tends to rotate relative to the stationary sheave portion 15, and therefore relative to the clutch cover.

Figure 6:
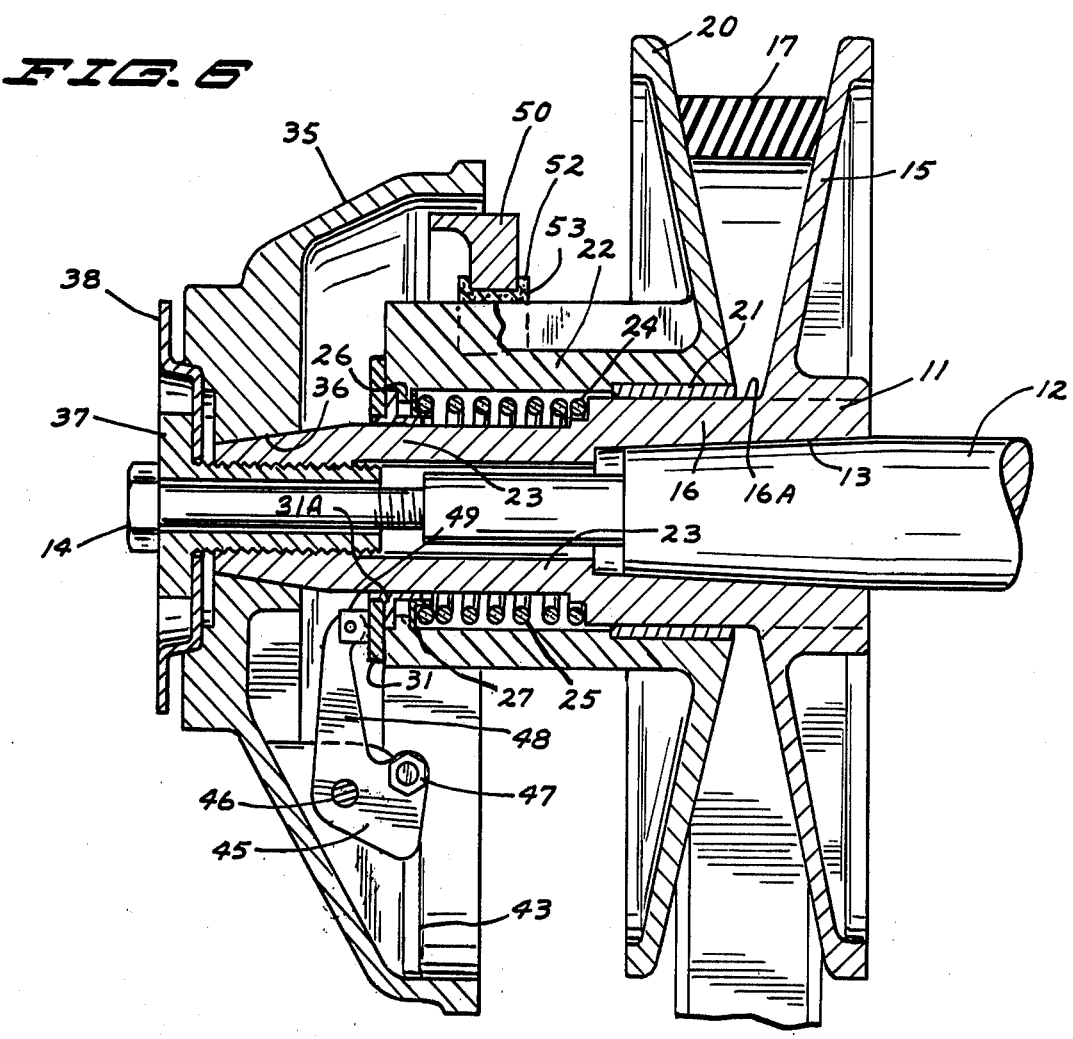
FIG. 6 is a sectional view taken along generally the same line as FIG. 3 with the clutch in a different drive ratio position.

The pads 52 and bridge members 50 are shown in section in FIGS. 3 and 6. The wear pads 52 are merely slipped into place, and can be retained with a small retainer boss 53 which will fit into a provided opening in the associated saddle type wear pad. Note that if sheave portion 20 and hub 22 rotate relative to hub 23 (and thus relative to sheave portion 15) the spiraling of the ribs will tend to cause the movable sheave portion 20 to move axially relative to portion 15, and the converse is also true. That is, if the movable sheave portion 20 is forced away from or toward sheave portion 15 the ribs 32 and saddle members on the clutch cover will cause sheave portion 20 to also rotate relative to hub 23.

In operation, the centrifugal or speed responsive action is achieved by operation of the arms 45. As the clutch starts to rotate, for example, with the belt 17 down in a non-driving position riding on the surface 16A, the speed of rotation of the shaft 12 will cause the weight 47 to tend to pivot radially outwardly about the axes of the pins 46. This will cause the actuator ends 48 and shoes 49 to bear against the washer 31, forcing the movable sheave 20 axially along the hub 16 toward the stationary plate 15. It can be seen that as this is done there will be some necessary rotation of the movable sheave portion 20 as the ribs 32 slide in their respective drive saddle members 52. This is possible of course because the movable sheave portion 20 is rotatably mounted on the hub portion 16. The actuator ends, and the shoes 49 will then bear against the thrust washer 31, and overcome the action of the spring 25 to force the two sheave portions together. Of course, depending on the speed of the shaft 12, the position of the sheave will be established as a function of the speed.

The "pick-up" speed, or the speed at which the belt 17 will be driven and lifted up from the surface 16A (assuming that it's riding against the surface) will depend on the force of the spring 25 tending to resist compression, as well as the configuration or geometry of the arms 45 and the mass of the weights 47. It should be noted, that as the pulley assembly rotates and the load increases the movable sheave portion 20 will move annularly and axially with respect to the stationary sheave portion 15 due to the action of the spiral ribs 32A, 32B, and 32C moving through the saddle members 52. The torque response feature acting against the spring 25 will thus cause the movable sheave portion 20 to separate from the stationary sheave portion 15. This can perhaps best be visualized in FIG. 5, where the direction of rotation of the shaft 12 (and also therefore the clutch cover 35) is shown. Because the stationary sheave portion 15 is directly drivable with the shaft 12 while the movable sheave portion 20 is drivable through the housing, saddles, and ribs, the movable sheave portion 20 tends to rotate annularly and move axially, with respect to the stationary sheave portion 15, as the load increases and decreases.

The arms 45, however, will overcome this action, and will force the sheave portion 20 toward the sheave portion 15 to establish an equilibrium condition.

Because of the way that the spiral ramps or ribs 32A, 32B and 32C are positioned, if for example, the load transmitted by belt 17 increases, there will be a greater tendency of the sheave portion 20 to separate from the sheave portion 15 as the belt pulls into the sheave and the separating force will cause the sheave portion 20 to tend to separate from the sheave portion 15 as the ribs 32 slide in their wear pads or saddle members 52. This also can be visualized in FIG. 5, perhaps best, by imagining that while the rotation of the shaft 12 is in the direction of the arrow shown, the increased separating load on the sheave portion 20 and the increased torque from shaft 12 both cause movable sheave portion 20 to move annularly and axially with respect to the stationary sheave portion 15 and thus separate the sheave portions. The reduced drive ratio would then permit the engine to immediately pick up speed at the higher load.

Conversely, if the load on belt 17 is decreased, so that the torque transmitted is decreased, assuming no substantial change in rpm, the sheave portion 20 would tend to return toward sheave portion 15 under the loading of arms 45 and the sheave portion 20 would move annularly and axially with respect to sheave portion 15.

The benefit is that the clutch is very responsive to any changes in torque or loads; particularly if the load on the belt increases, the clutch will quickly shift to a lower drive ratio so that the engine speed (at shaft 12) can be maintained at its peak rpm in the most efficient engine operating range and in this way can continue to deliver its maximum horsepower.

Another advantage is that when braking, that is if a reverse load is placed on the shaft 12 when the throttle is released, for example, the sheave will tend to move to its highest ratio. The spiral load will urge the sheave portions toward each other.

Stated another way, in the present device the torque responsive means is in opposition to the centrifugal force or speed sensitive means, in that the ribs 32 and saddles 52 will tend to separate the sheave portions with an increase in the torque tending to move sheave portion 20 annularly and axially with respect to sheave portion 15. In other words, the clutch will shift to a lower ratio with an increase in torque.

A similar device can be used as a driven pulley if desired. Ribs that are zero draft and which are straight can be used for permitting rotational driving between the pulley sections as the sections will slide axially. The sheave will be driving the output shaft in the described arrangement rather than being driven by a shaft, and torque sensitive means also can be incorporated if desired. Again, the driven pulley would be arranged to tend to shift to a lower ratio with an increase in torque. However, on a driven pulley this lower ratio means that an increase in torque would tend to force the sheave portions together.

The outer surface hub 22 and the top and side surfaces of ribs 32 are die cast with zero draft in axial direction. That is, the diameter of the ribs is constant throughout the length of hub 22. No machining is necessary for operation. The constant radial depth and width of the ribs is necessary for proper driving relationship across the full range of axial travel of the movable sheave portion. Otherwise, as is normal, the hub and ribs may taper from the outer end of the hub to the sheave plate.

The ability to die cast the external drive ribs with zero draft eliminates any machining on the hub and not only saves money but also increases strength or integrity under centrifugal forces on the clutch.

The die cast mold or tool for the hubs 22 and ribs 32 can be made with three floating or loose segments separating along lines bisecting the ribs and these segments may be separated radially after die casting. This may be visualized in FIG. 4 where the end view of the ribs 32 shows that three sections of a die can be radially removed from a formed part. The three loose sections can be held in an outer shell that is axially removed before the three sections are removed radially. Thus, the draft angle from one end of the hub to the other which normally is needed in an axial direction for forming such sheaves is eliminated. The tops of the ribs and the hub outside diameter do not need to have a taper.

Reviewing the operation during operating conditions, balanced force exists between the belt and pulley for any steady state condition of operation. Greater load will cause an increase of transmitted force which upsets the balanced condition causing a change in the axial relationship of the pulley sections. Less load reduces transmitted force which will also cause an upset of the balanced condition of steady state operation. In the first instance the spiral direction will tend to make the pulley sections move apart. In the second condition the spiral direction tends to make the pulley sections move closer together.

What is claimed is:

1. A pulley assembly for a V belt comprising first and second pulley sections, each of said sections comprising one side of the pulley assembly, said first section being adapted to be connected to a shaft, said second section being mounted for movement annularly and axially relative to said first section in direction toward and away from the first section to define a variable width V belt groove between the sections, at least one of said sections including a hub, rib means on the hub extending in generally radial direction to define a drive surface extending outwardly from the axis of the shaft and having a length extending in direction along the longitudinal axis of said shaft and part annularly around the hub, and a follower member drivably mounted on the other of the sections from the section having said hub, said follower member comprising a removable saddle straddling the rib and effecting a driving engagement therewith when the second section tends to be rotated relative to the first section, and means tending to urge said pulley sections toward each other when they are under rotation.

2. The combination as specified in claim 1 wherein said rib is spiralled in direction along the longitudinal axis of the hub, with the spiral of the rib being selected to cause said belt being carried by said V belt pulley assembly to shift into a higher numerical output drive ratio upon an increase in load on such a belt.

3. The combination as specified in claim 1 wherein said means tending to urge said pulley sections together comprises centrifugally responsive actuating arms with weights, said centrifugally responsive means acting on one of said pulley sections to tend to move the first and second sections toward each other.

4. A V belt pulley assembly including a pair of sheave plates, a first of said sheave plates having a first hub, said first hub having a longitudinal axial direction extending along the axis of rotation of said pulley assembly, means to drivably mount said first hub to a shaft, a second of said sheave plates being rotatably and axially movably mounted on said first hub, said second sheave plate having a second hub, drive means between said first hub and said second hub including a generally radially extending rib on the exterior surface of said second hub to provide a rotational driving surface, said rib extending primarily in axial direction of said shaft and said hubs and partially annularly around said second hub, said first hub extending axially outwardly beyond said second hub when said second sheave plate is in normal working position, a housing attached to said first hub, said housing including portions which overlie said second hub, and a follower member drivably mounted on said housing to effect a rotationally driving engagement between said housing and said rib comprising a removable saddle member mounted on and carried by said housing, said saddle member defining a groove to slidably receive the rib on said second hub.

5. The combination specified in claim 4 with centrifugal weight actuated arm means carried by said housing and having end portions acting against said second hub to tend to urge said second hub and second sheave plate toward said first sheave plate upon an increase in the speed of rotation of said pulley assembly.

6. A V belt pulley assembly comprising a first V belt pulley section having a laterally extending first hub, means to drivably connect said first section and hub to a shaft, a second pulley section mounted on said first hub, said second pulley section having a second hub having an outer surface, an outer end portion and an inner surface surrounding at least portions of said first hub, a plurality of ribs spiralled with a low lead angle extending in direction of the rotational axis of said first and second hubs and protruding outwardly from the outer surface of said second hub, a housing attached to said first hub and having a flange portion overlying and spaced outwardly from end portions of said second hub, drive members attached to said housing and overlying said ribs, said drive members comprising means defining grooves to slidably fit over said ribs and effect a rotational driving connection between said first and second hubs.

7. The assembly of claim 6 wherein said drive members include replaceable saddle members having surfaces which engage said ribs to effect driving relation between said first and second hubs in either direction of rotation.

8. The assembly of claim 6 wherein said ribs are spiralled in direction so that when the assembly is under driving load, increased load increases the force from the reaction of the spiral rib tending to separate said pulley sections.

9. The assembly of claim 6 with centrifugally responsive actuating arms with weights, said centrifugally responsive means acting between said first and second hubs to tend to move said pulley sections together with increasing rotational speed.

* * * * *